(12) United States Patent
Byun et al.

(10) Patent No.: US 7,102,723 B2
(45) Date of Patent: Sep. 5, 2006

(54) LIQUID CRYSTAL DISPLAY DEVICE AND METHOD FOR FABRICATING THE SAME

(75) Inventors: Young Sang Byun, Kyongsangbuk-do (KR); Jeong Joon Lee, Taegu-kwangyokshi (KR); Heon Do Yun, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 69 days.

(21) Appl. No.: 10/874,221

(22) Filed: Jun. 24, 2004

(65) Prior Publication Data

US 2005/0073638 A1 Apr. 7, 2005

(30) Foreign Application Priority Data

Oct. 6, 2003 (KR) .................... 10-2003-0069278

(51) Int. Cl.
*G02F 1/1339* (2006.01)

(52) U.S. Cl. .................... 349/156; 349/153; 349/155; 349/190

(58) Field of Classification Search ............... 349/156, 349/153, 155, 190
See application file for complete search history.

(56) References Cited

U.S. PATENT DOCUMENTS

| 5,946,070 | A | * | 8/1999 | Kohama et al. ............. 349/156 |
| 6,304,308 | B1 | * | 10/2001 | Saito et al. .................. 349/155 |
| 2003/0179328 | A1 | * | 9/2003 | Manabe et al. ............. 349/110 |
| 2004/0239868 | A1 | * | 12/2004 | Jung et al. .................. 349/187 |

* cited by examiner

*Primary Examiner*—David Nelms
*Assistant Examiner*—(Nancy) Thanh-Nhan P Nguyen
(74) *Attorney, Agent, or Firm*—Morgan, Lewis & Bockius, LLP

(57) ABSTRACT

A liquid crystal display (LCD) device includes first and second substrates facing each other and having a display area and a non-display area, a sealant on a boundary between the display area and the non-display area to bond the first and second substrates, a first alignment layer on the display area of the first substrate, and a first dam in the display area of the first substrate inside the sealant to prevent spread of an alignment material of the first alignment layer.

22 Claims, 9 Drawing Sheets

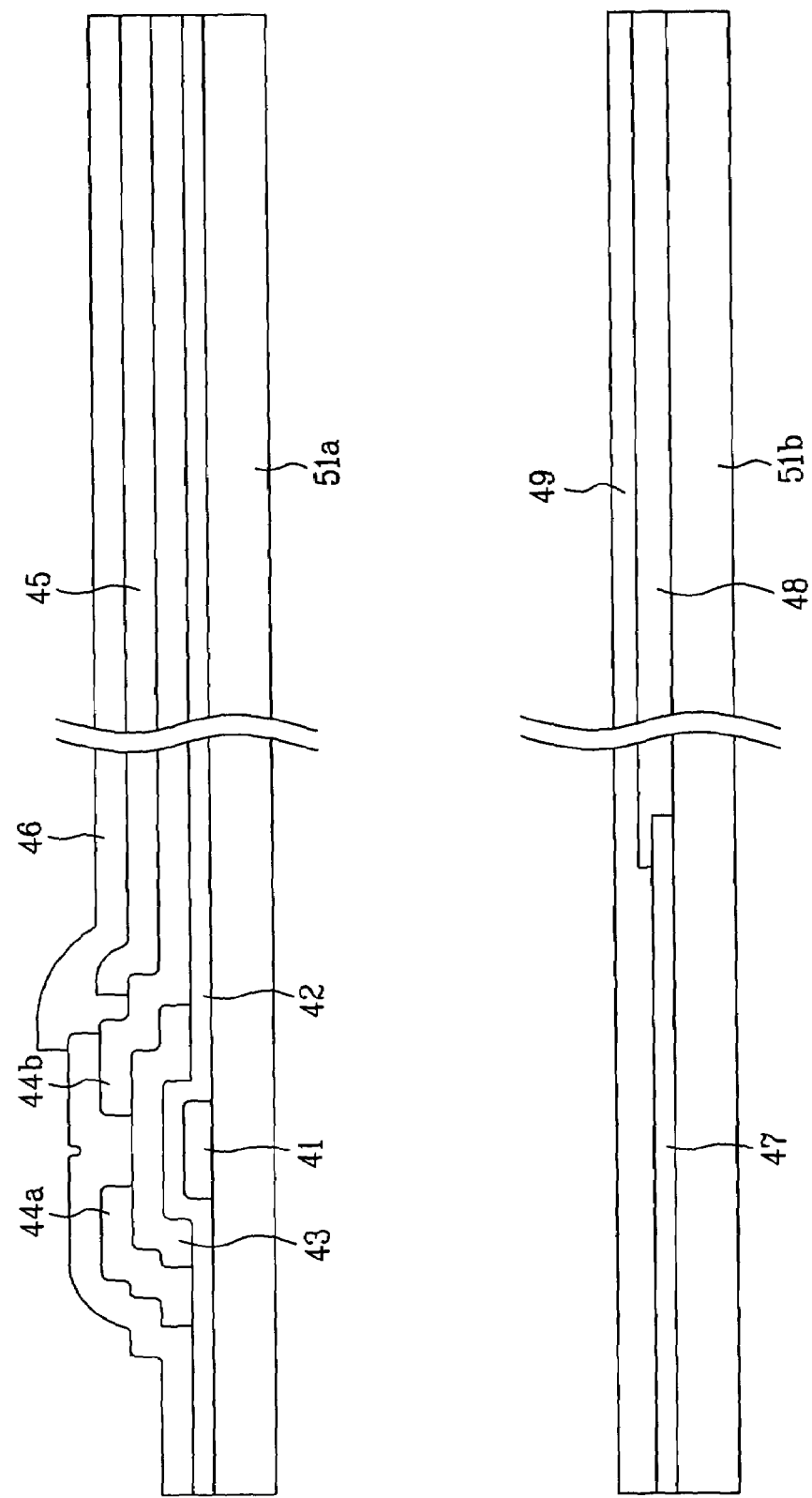

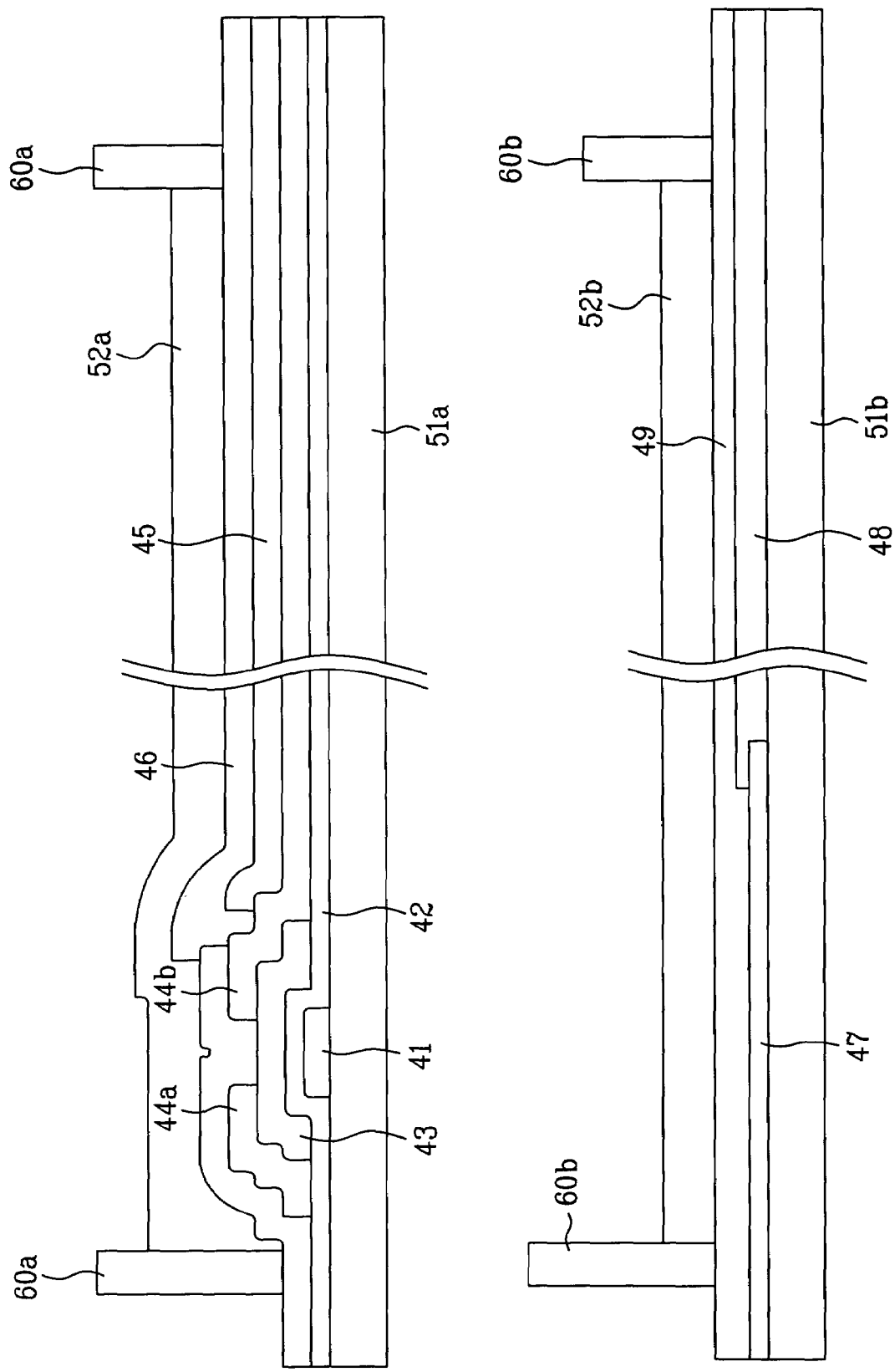

LIQUID CRYSTAL DISPLAY DEVICE AND METHOD FOR FABRICATING THE SAME

This application claims the benefit of the Korean Application No. P2003-69278, filed on Oct. 6, 2003, which is hereby incorporated by reference.

BACKGROUND OF THE INVENTION

1. Field of the Invention

The present invention relates to a liquid crystal display (LCD) device, and more particularly, to an LCD device and a method for fabricating the same, capable of preventing contamination of sealant and deterioration of adhesive strength caused by the spread of alignment material.

2. Discussion of the Related Art

Demands for various display devices have increased with development of information technology. Particularly, many efforts have been made to research and develop various flat display devices such as LCD, plasma display panel (PDP), electroluminescent display (ELD), and vacuum fluorescent display (VFD). Among those, the LCD device has been most widely used as a substitute for a cathode ray tube (CRT) because of thin profile, lightness in weight, and low power consumption. For example, the LCD device may be utilized as a display for a computer monitor, or a television to receive and display broadcasting signals. In order to use the LCD device in various fields as a general display, it is very important that the LCD device can display a high quality picture with high resolution and high luminance on a large-sized screen, while maintaining lightness in weight, thin profile, and low power consumption.

The LCD device includes an LCD panel displaying a picture, and a driving part supplying a driving signal to the LCD panel. The LCD panel consists of first and second substrates bonded to each other at a predetermined interval, and a liquid crystal layer formed between the first and second substrates.

The first substrate, which may be a thin film transistor (TFT) array substrate, includes a plurality of gate lines arranged along a first direction at fixed intervals, a plurality of data lines arranged along a second direction perpendicular to the first direction at fixed intervals, a plurality of pixel electrodes arranged in a matrix-type configuration within pixel regions P defined by crossing the gate and data lines, and a plurality of TFTs T enabled according to signals supplied to the gate lines for transmitting signals from the data lines to the pixel electrodes. Also, the second substrate, which may be a color filter array substrate, includes a black matrix layer that prevents light from portions of the first substrate except for the pixel regions P, an R/G/B color filter layer for displaying various colors, and a common electrode for producing the image on the color filter layer. Then, the first and second substrates are bonded to each other by sealant and maintained at a predetermined interval with spacers, and liquid crystal is injected therebetween. Meanwhile, alignment layers are formed on opposing surfaces of the first and second substrates, and rubbed to align liquid crystal molecules of the liquid crystal layer.

Next, an LCD device according to the related art will be described with reference to the accompanying drawings. FIG. 1 is a plane view illustrating an LCD device according to the related art. FIG. 2 is a cross-sectional view taken along I–I' of FIG. 1. FIG. 3 is a plane view illustrating a first substrate of the related art LCD device to illustrate the spread of alignment material. FIG. 4 is a cross-sectional view taken along II–II' of FIG. 3.

As shown in FIGS. 1 and 2, the related art LCD device includes first and second substrates 11a, 11b bonded to each other at a predetermined interval therebetween. The first substrate 11a is formed with a display area 21 to display a picture and a non-display area 22 of a pad region where no picture is displayed. The display area 21 is divided into an active region 21a and a liquid crystal margin region 21b. Further, the active region 21a includes a plurality of gate and data lines crossing each other, and a TFT at a crossing point of the gate and data lines. The liquid crystal margin region 21b is formed surrounding the active region 21a where the liquid crystal spreads. Even though not shown, the liquid crystal margin region 21b is hidden by a black matrix layer.

Also, as shown in FIGS. 1 and 2, a liquid crystal layer 14 and a sealant 13 are formed between the first and second substrates 11a, 11b. The sealant 13 is arranged on the boundary between the non-display area 22 and the liquid crystal margin region 21b to bond the first and second substrates 11a, 11b.

Also, as shown in FIG. 2, first and second alignment layers 12a, 12b are formed on opposing surfaces of the first and second substrates 11a, 11b to align liquid crystal molecules of the liquid crystal layer 14 at one direction. The first and second alignment layers 12a, 12b may be formed of a polymer material such as polyamide, polyamide compound, PVA (Polyvinyl alcohol) and polyamic acid. Also, the first and second alignment layers 12a, 12b may be formed of a photosensitive material such as PVCH (PolyvinylCinnamate), PSCN (PolysiloxaneCinnamate) and CelCN (CelluloseCinnmate)-type compound. The first and second alignment layers 12a, 12b are formed before forming the sealant 13.

In order to coat the first and second alignment layers 12a, 12b on the first and second substrates 11a, 11b, an alignment layer coating device is required to uniformly coat an alignment material on the first and second substrates 11a, 11b. The alignment layer coating device may perform a coating in various methods, such as spin, spray, dip, printing, and inkjet methods. Herein, the alignment layer coating device uses the inkjet method and includes a pressure tank storing the alignment material and a raw material for the alignment layer, an alignment material provider receiving and storing an optimal amount of the alignment material from the pressure tank, and a plurality of heads discharging the alignment material to the substrate. Specifically, the alignment material is discharged to the first and second substrates 11a, 11b through the holes provided in the heads, and then the alignment material is formed into the first and second alignment layers 12a, 12b by rubbing.

Since the alignment material has viscosity low enough to pass through the holes, the alignment material spreads to all directions of the first and second substrates 11a, 11b before treatment of the alignment material discharged to the first and second substrates 11a, 11b. As show in FIGS. 3 and 4, when the alignment material (slant portion) spreads to a portion for the sealant 13 over the liquid crystal margin region 21b, the portion for the sealant 13 is contaminated by the alignment material. Also, it causes deterioration of adhesion of the sealant 13 formed on the boundary between the non-display area 22 and the liquid crystal margin region 21b to bond the first and second substrates 11a, 11b. In addition, when the first and second substrates 11a, 11b are bonded to each other, the sealant 13 is damaged due to the deterioration of the adhesion thereof.

SUMMARY OF THE INVENTION

Accordingly, the present invention is directed to a liquid crystal display (LCD) device and a method for fabricating the same that substantially obviates one or more problems due to limitations and disadvantages of the related art.

An object of the present invention is to provide an LCD device and a method for fabricating the same, having a plurality of dams at liquid crystal margin region to prevent an alignment material from spreading to the boundary area for sealant, thereby preventing the sealant from being damaged by deterioration of adhesion thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD device includes first and second substrates facing each other and having a display area and a non-display area, a sealant formed on a boundary between the display area and the non-display area to bond the first and second substrates, a first alignment layer on the display area of the first substrate, and a first dam in the display area of the first substrate inside the sealant to prevent the spread of alignment material of the first alignment layer.

In another aspect, a method for fabricating a liquid crystal display (LCD) device includes the steps of preparing first and second substrates having a display area and a non-display area, forming a first dam around the display area on the first substrate, forming a first alignment layer on the first substrate inside the first dam; forming a sealant on the boundary between the display area and the non-display area, and bonding the first and second substrates to each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to illustrate the principle of the invention. In the drawings:

FIG. 8A to FIG. 8E are cross-sectional views illustrating the fabrication method of the LCD device according to an embodiment of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
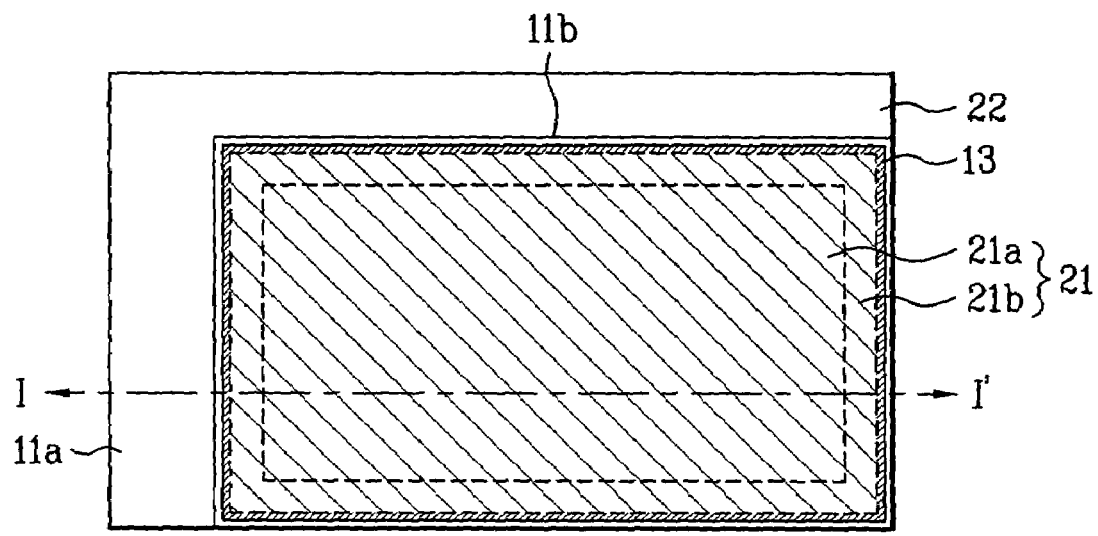
FIG. 1 is a plane view illustrating an LCD device according to the related art.
Figure 2:
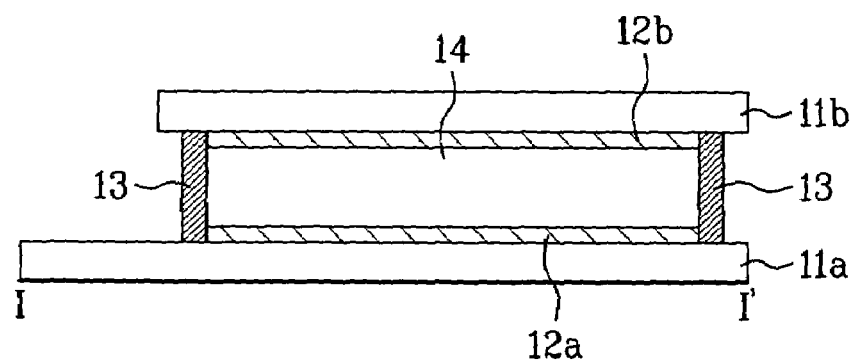
FIG. 2 is a cross-sectional view taken along I–I' of FIG. 1.
Figure 3:
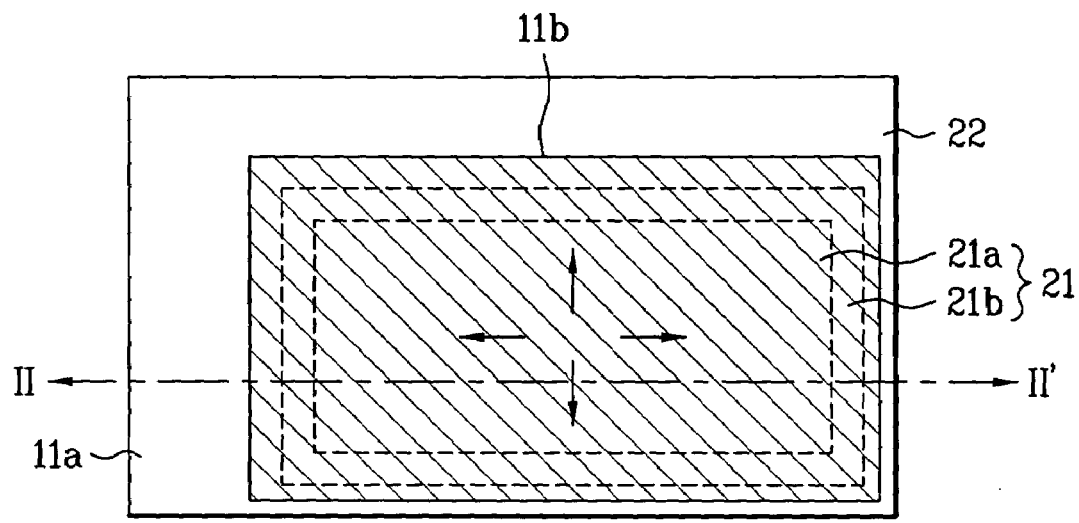
FIG. 3 is a plane view illustrating a first substrate of the related art LCD device to illustrate the spread of alignment material.
Figure 4:
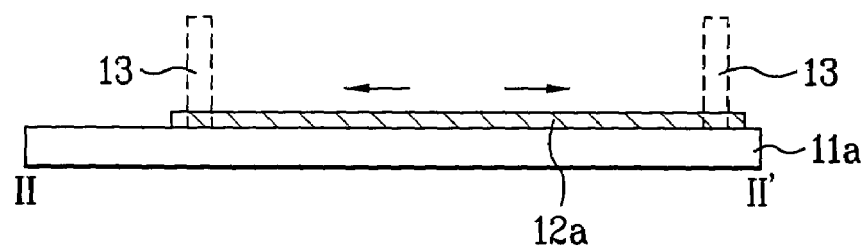
FIG. 4 is a cross-sectional view taken along II–II' of FIG. 3.
Figure 5:
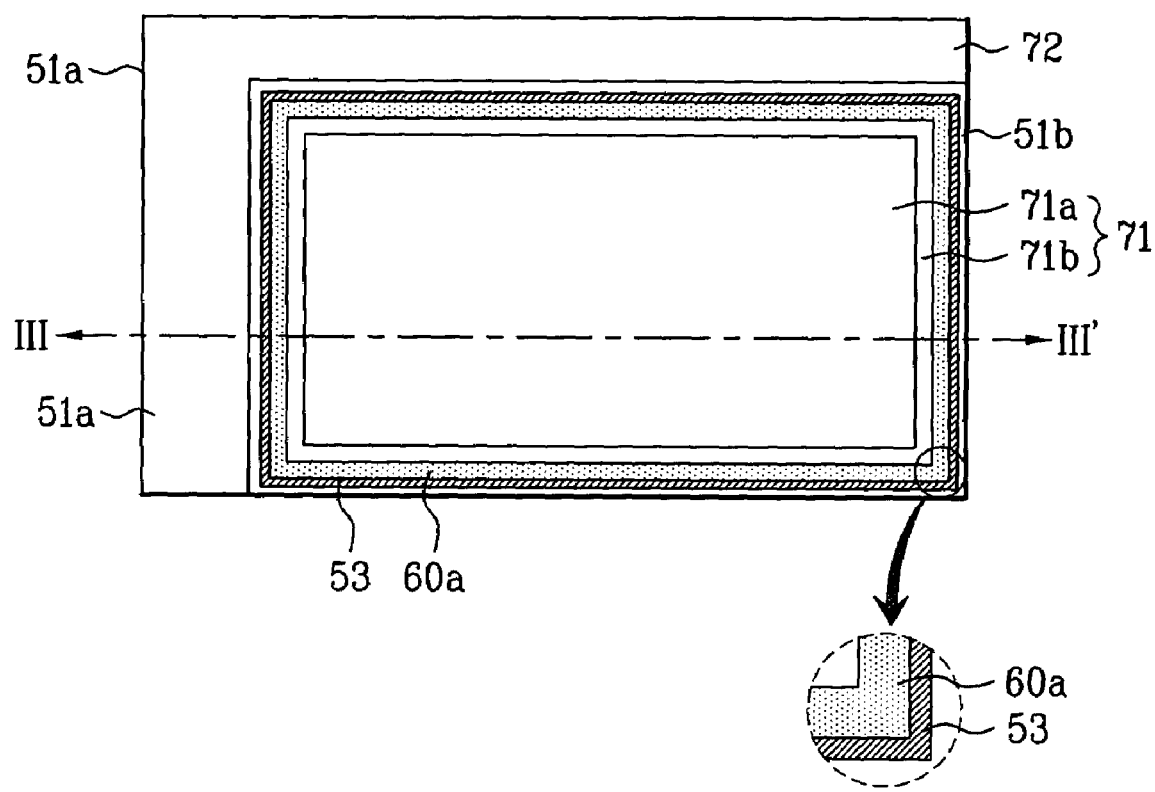
FIG. 5 is a plane view illustrating an LCD device according to an embodiment of the present invention.
Figure 6:
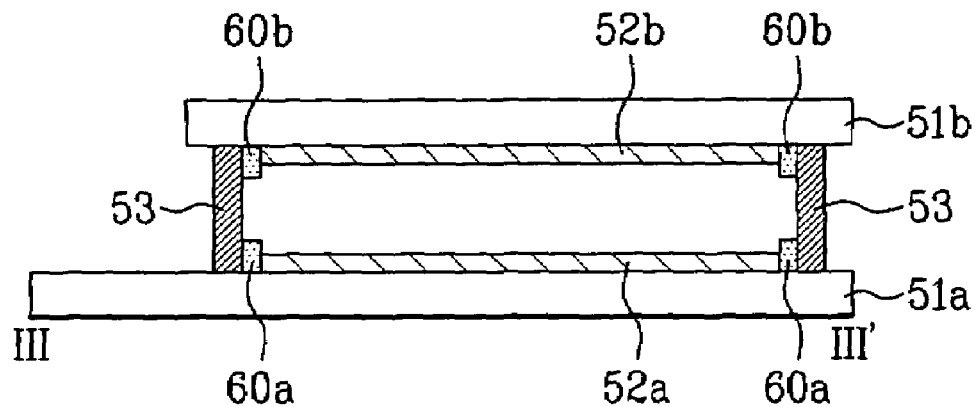
FIG. 6 is a cross-sectional view taken along III–III' of FIG. 5.
Figure 7:
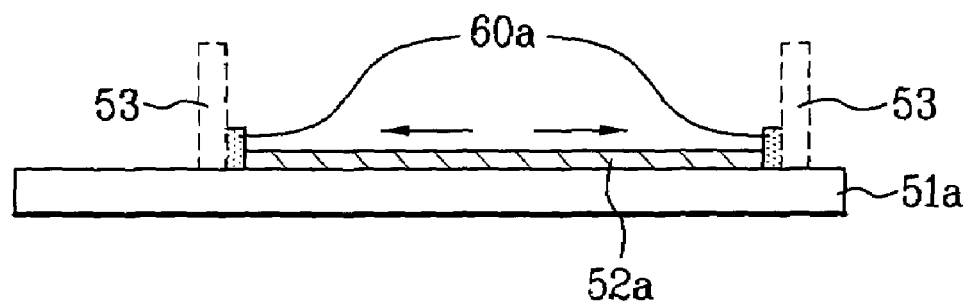
FIG. 7 is a cross-sectional view illustrating a first substrate shown in FIG. 5, illustrating prevention of the spread of alignment material.

FIG. 5 is a plane view illustrating an LCD device according to an embodiment of the present invention. FIG. 6 is a cross-sectional view taken along III–III' of FIG. 5. FIG. 7 is a cross-sectional view illustrating a first substrate shown in FIG. 5, illustrating prevention of the spread of alignment material by a first dam.

As shown in FIGS. 5 and 6, the LCD device according to an embodiment of the present invention includes a display area 71 displaying a picture and a non-display area 72 surrounding the display area 71. Herein, the display area 71 is divided into an active region 71a and a liquid crystal margin region 71b. In more detail, the active region 71a includes a plurality of gate and data lines crossing each other and a thin film transistor at a crossing point of the gate and data lines, thereby displaying the real picture. The liquid crystal margin region 71b is formed surrounding the active region 71a, thereby receiving the spread of liquid crystal.

As shown in FIG. 6, the LCD device according to an embodiment of the present invention includes a first substrate 51a having a thin film transistor array (not shown) in the display area 71, a second substrate 51b having a color filter array in the display area 71, and a liquid crystal layer 54 formed between the first and second substrates 51a, 51b. Herein, the first substrate 51a is in opposite to the second substrate 51b, and the first and second substrates 51a, 51b are bonded to each other at a predetermined interval.

Also, a sealant 53 is formed on the boundary between the liquid crystal margin region 71b and the non-display area 72 to bond the first and second substrates 51a, 51b. First and second dams 60a, 60b are formed adjacent to the sealant 53 along the liquid crystal margin region 71b, thereby preventing the alignment material from spreading to an area for the sealant 53. Also, first and second alignment layers 52a, 52b are formed on opposing surfaces of the first and second substrates 51a, 51b inside the first and second dams 60a, 60b. When the alignment material is coated on the display area 71, the first and second dams 60a, 60b prevent the alignment material from spreading to the boundary area for the sealant 53.

During the process of coating the alignment material by the alignment layer coating device, since viscosity of the alignment material is low, the alignment material may spread to the boundary area for the sealant 53 on the display area 71 of the first and second substrates 51a, 51b, thereby contaminating the area for the sealant 53. In this case, as shown in FIG. 7, the first and second dams 60a, 60b are formed inside the boundary area for the sealant 53 before the sealant 53 is formed on the boundary area, to prevent the contamination of the area for the sealant 53 by the alignment material. Herein, the sealant 53 denoted as a dotted line, which means that the sealant 53 has not been formed on the first substrate 51a. The second dam 60b is formed on a black matrix layer.

As shown in FIGS. 5 and 7, the first and second dams 60a, 60b have rectangular shapes in cross-section. Although not shown, the first and second dams 60a, 60b may also have triangular, semicircular or lozenge shapes in cross-section. In addition, the first and second dams 60a, 60b may be formed of the same material as those of a color filter layer, the black matrix layer and spacers. For example, the first and second dams 60a, 60b may be formed of any one of resin, chrome, acryl, epoxy and metal. Also, it is preferable to form the first and second dams 60a, 60b at a height of 400 angstroms (□) to 6 micrometers (□) and a width of 400 angstroms (□) to 6 millimeters (□). In FIG. 6, the first and second alignment layers 52a, 52b are respectively formed on the first and second substrates 51a, 51b. Alternatively, it is possible to form one alignment layer on any one of the first and second substrates 51a, 51b.

A method for fabricating an LCD device according to an embodiment of the present invention will be described in detail. FIG. 8A to FIG. 8E are cross-sectional views illustrating such a fabrication method.

As shown in FIG. 8A, the first substrate 51a is formed as the thin film transistor array including the gate and data lines and the pixel electrode, and the second substrate 51b is formed as the color filter array. The gate line (not shown) includes a gate electrode 41 on the first substrate 51a. A gate insulating layer 42 is deposited on the entire surface of the first substrate 51a. Then, a semiconductor layer is deposited and patterned on the entire surface of the first substrate 51a, and an active layer 43 of the thin film transistor is formed on the gate insulating layer 42 above the gate electrode 41. After that, the data line (not shown) including source and drain electrodes 44a, 44b is formed in perpendicular to the gate line. Also, the source and drain electrodes 44a, 44b are arranged at both sides of the active layer 43. Then, a passivation layer 45 is formed on the entire surface of the first substrate 51a including the source and drain electrodes 44a and 44b, and a contact hole is formed in the drain electrode 44b. The pixel electrode 46 is formed in a pixel region on the passivation layer 45 to connect with the drain electrode 44b.

Next, the second substrate 51b includes a black matrix layer 47, a color filter layer 48 and a common electrode 49. Herein, the black matrix layer 47 is formed corresponding to the portion except for the pixel region of the first substrate 51a, the color filter layer 48 is formed corresponding to the pixel region, and the common electrode 49 is formed on the entire surface of the second substrate 51b. Accordingly, the first substrate 51a as the thin film transistor array and the second substrate 51b as the color filter array are thus prepared. Herein, FIG. 8A illustrates a TN mode LCD device. However, an embodiment of the present invention does not limited to this and may be applied to various modes of an IPS mode LCD device, a reflective type LCD device, a transflective type LCD device, etc.

Figure 8B:
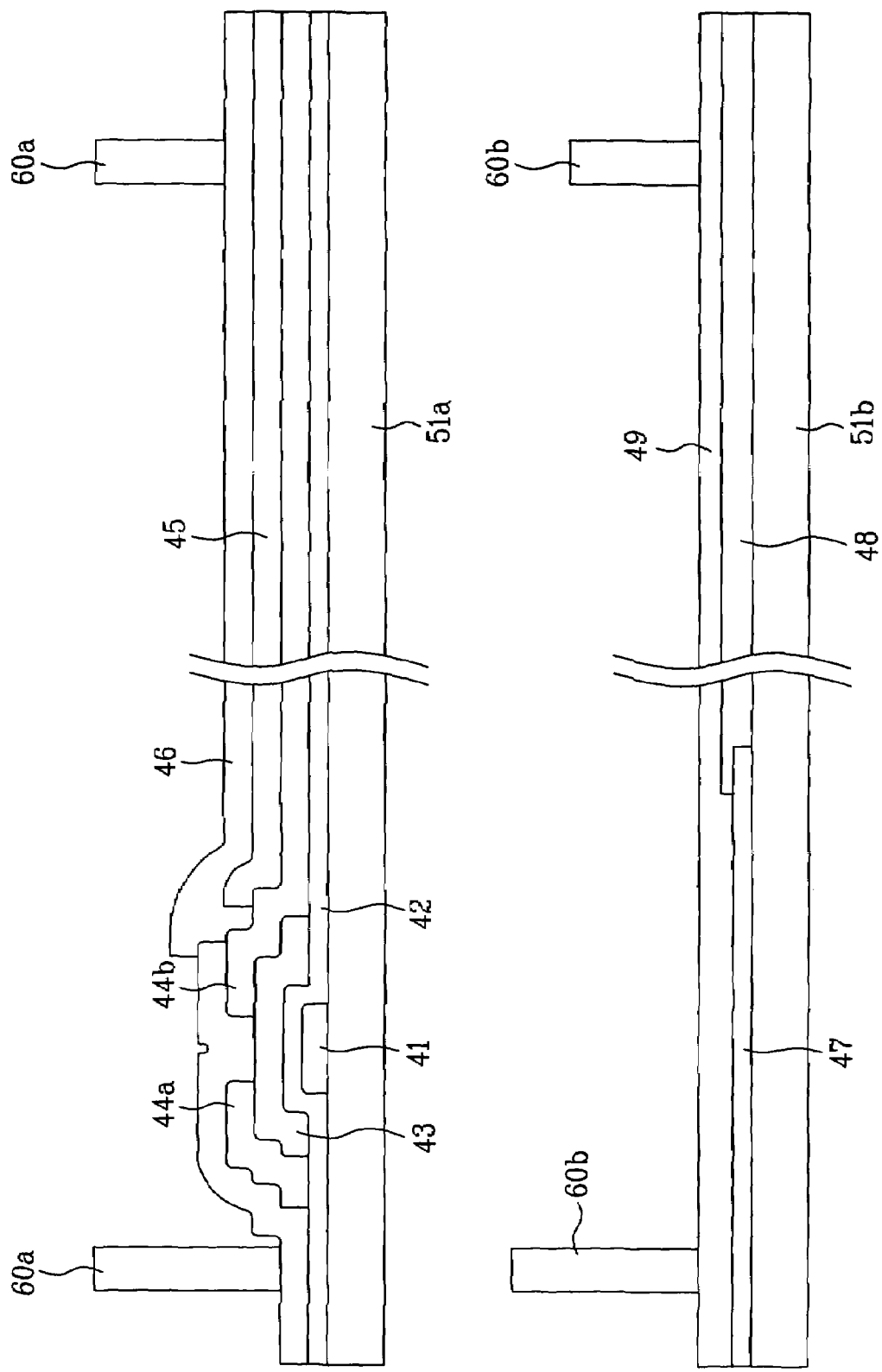

Referring to FIG. 5 and FIG. 8B, the first dam 60a is formed along the boundary area between the liquid crystal margin region 71b and the non-display area 72 on the first substrate 51a. The second dam 60b is formed on the second substrate 51b corresponding to the first dam 60a. Herein, the first and second dam 60a, 60b may have rectangular, triangular, semicircular or lozenge shapes in cross section. In addition, the first and second dams 60a, 60b are formed of the same material as those of the color filter layer 48, the black matrix layer 47, and spacers (not shown). For example, the first and second dams 60a, 60b may be formed of any one of resin, chrome, acryl, epoxy and metal. Also, it is preferable to form the first and second dams at a height of 400 angstroms (□) to 6 micrometers (□) and a width of 400 angstroms (□) to 6 millimeters (□).

Referring to FIG. 8C, the alignment material is coated on the first substrate 51a inside the first dam 60a by the alignment layer coating device, and then is cured and rubbed, thereby forming the first alignment layer 52a. Similarly, the alignment material is coated on the second substrate 51b inside the second dam 60b by the alignment material coating device, and then is cured and rubbed, thereby forming the second alignment layer 52b. In this case, even though the alignment material spreads to all directions, the spread of the alignment material is controlled by the first and second dams 60a, 60b.

Figure 8D:
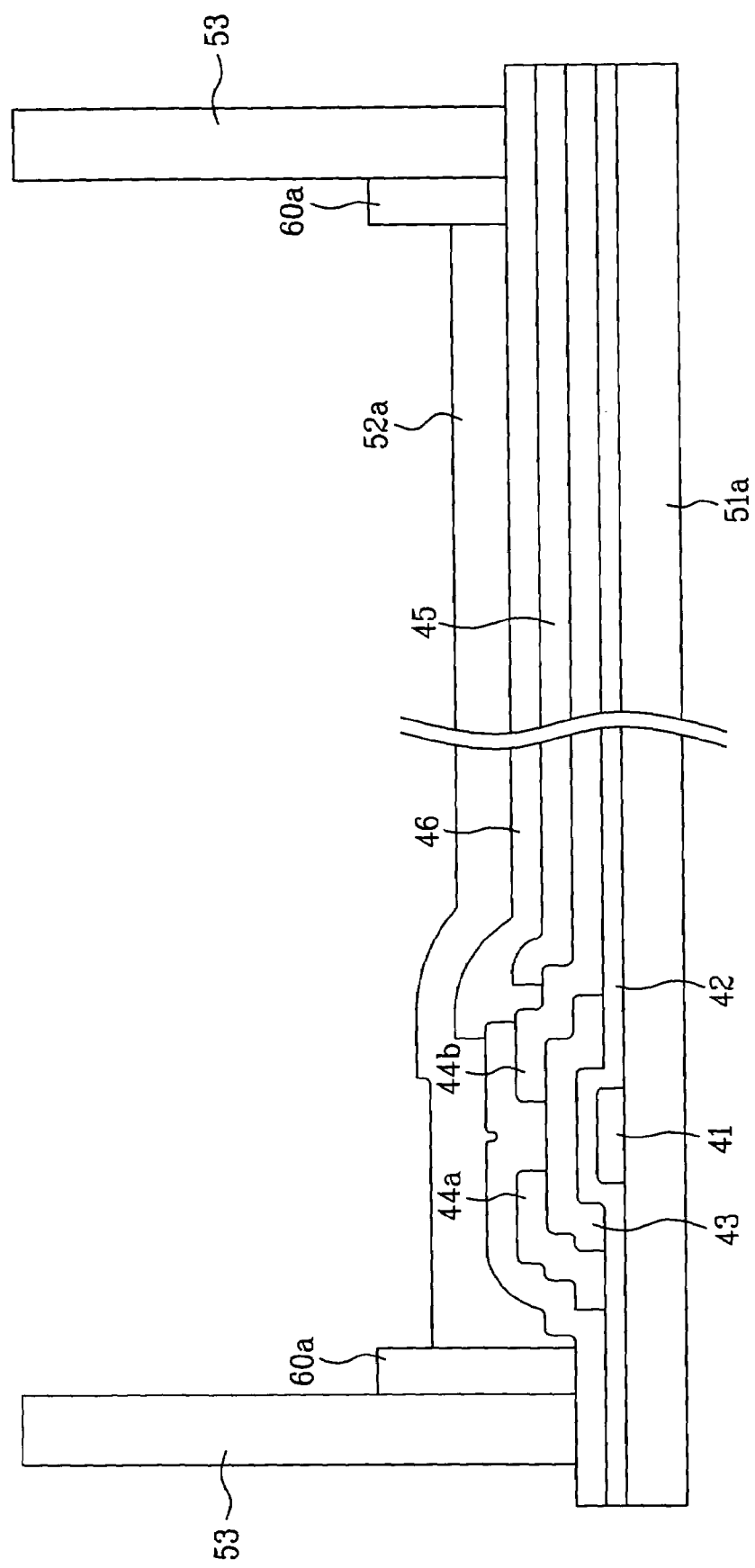

As shown in FIG. 5 and FIG. 8D, the sealant 53 is formed along the boundary area between the display area 71 and the non-display area 72 on the first substrate 51a. Alternatively, the sealant 53 may be formed along the boundary area between the display area 71 and the non-display area 72 on the second substrate 51b.

Figure 8E:
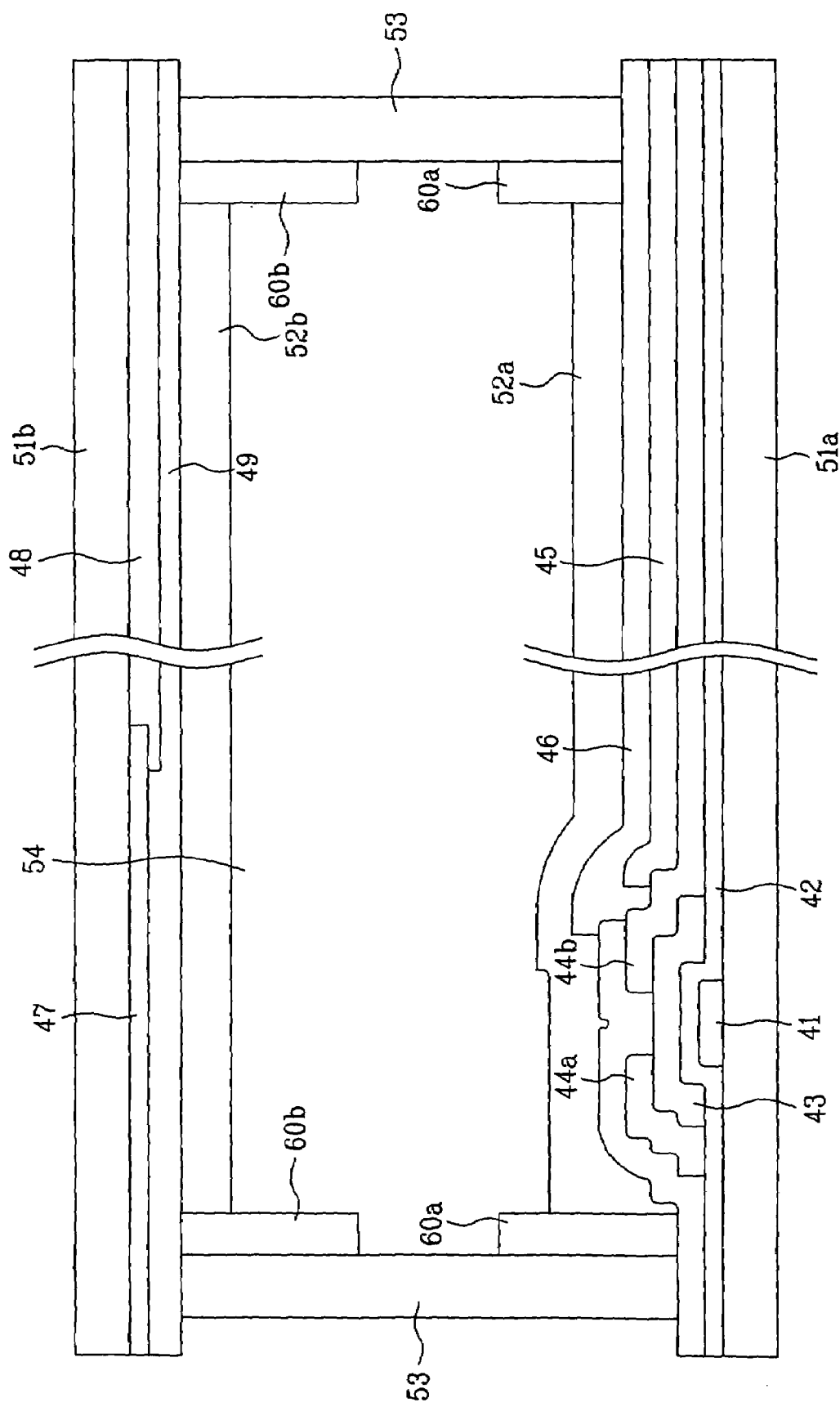

Referring to FIG. 8E, the second substrate 51b is inverted to make the first and second alignment layers 52a, 52b facing each other and to be bonded to the first substrate 51a. After that, the liquid crystal is injected between the first and second substrates 51a, 51b, thereby forming the liquid crystal layer 54. Herein, a vacuum state is maintained in a space between the first and second substrates 51a, 51b, and an inlet is dipped into a container having the liquid crystal, whereby the liquid crystal is injected into the space by osmotic pressure to form the liquid crystal layer 54. Alternatively, before the bonding process of the first and second substrates 51a, 51b, an optimal amount of the liquid crystal is dispersed on the first substrate 51a or the second substrate 51b, and then the first and second substrates 51a, 51b are bonded to each other.

As mentioned above, the LCD device according to an embodiment of the present invention and the method for fabricating the same have the following advantages. In the LCD device according to an embodiment of the present invention, the first and second dams are formed to prevent the alignment material from spreading to the area for the sealant, thereby preventing the area for the sealant from being contaminated with the alignment material. As a result, the sealant is not damaged, simultaneously, the adhesion of the sealant is not deteriorated.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A liquid crystal display (LCD) device, comprising:
   first and second substrates facing each other and having a display area and a non-display area;
   a sealant on a boundary between the display area and the non-display area to bond the first and second substrates;
   a first alignment layer on the display area of the first substrate; and a first dam in the display area of the first substrate inside the sealant to prevent spread of an alignment material of the first alignment layer, wherein the first dam surrounds the display area.

2. The LCD device of claim 1, further comprising:

a second alignment layer on the display area of the second substrate; and a second dam in the display area of the second substrate inside the sealant preventing spread of an alignment material of the second alignment layer.

3. The LCD device of claim 2, wherein the first substrate comprises thin film transistor array substrate having a gate line, a data line and a pixel electrode.

4. The LCD device of claim 2, wherein the second substrate is formed of a color filter array substrate including a black matrix layer and a color filter layer.

5. The LCD device of claim 4, wherein the second dam is formed on the black matrix layer corresponding to the first dam.

6. The LCD device of claim 2, wherein the first and second dams are formed as one of rectangular, triangular, semicircular and lozenge shapes.

7. The LCD device of claim 2, wherein the first and second dams are formed of the same material as that of one of the color filter layer and the black matrix layer.

8. The LCD device of claim 2, wherein the first and second dams are formed of one of resin, chrome, acryl, epoxy and metal.

9. The LCD device of claim 2, wherein the sealant is formed adjacent to the first and second dams.

10. The LCD device of claim 2, wherein the first and second dams have a height of 400 angstroms (Å) to 6 micrometers (μm) and a width of 400 angstroms (Å) to 6 millimeters (μm).

11. The LCD device of claim 2, wherein the display area comprises an active region and a liquid crystal margin region surrounding the active region, the first and second dams are formed in the liquid crystal margin region, and the sealant is formed on the boundary between the liquid crystal margin region and the non-display area.

12. A method for fabricating a liquid crystal display (LCD) device, comprising:

preparing first and second substrates having a display area and a non-display area;

forming a first dam surrounding the display area on the first substrate;

forming a first alignment layer on the first substrate inside the first dam;

forming a sealant on the boundary between the display area and the non-display area; and bonding the first and second substrates to each other.

13. The method of claim 12, further comprising:

forming a second dam on the second substrate corresponding to the first dam of the first substrate; and forming a second alignment layer on the second substrate inside the second dam.

14. The method of claim 13, wherein the first and second dams are formed as one of rectangular, triangular, semicircular and lozenge shapes.

15. The method of claim 13, wherein the first and second dams are formed of the same material as that of one of the color filter layer and the black matrix layer.

16. The method of claim 13, wherein the first and second dams are formed of one of resin, chrome, acryl, epoxy and metal.

17. The method of claim 13, wherein the sealant is formed adjacent to the first and second dams.

18. The method of claim 13, wherein the first and second dams are formed at a height of 400 angstroms (Å) to 6 micrometers (μm) and a width of 400 angstroms (Å) to 6 millimeters (μm).

19. The method of claim 13, wherein the display area comprises an active region and a liquid crystal margin region surrounding the active region, the first and second dams are formed in the liquid crystal margin region, and the sealant is formed on the boundary between the liquid crystal margin region and the non-display area.

20. The method of claim 13, wherein the first substrate comprises thin film transistor array substrate having a gate line, a data line and a pixel electrode.

21. The method of claim 13, wherein the second substrate comprises of a color filter array substrate including a black matrix layer and a color filter layer.

22. The method of claim 13, wherein the second dam is formed on the black matrix layer corresponding to the first dam.

* * * * *